(12) United States Patent
Hayashi et al.

(10) Patent No.: US 7,264,096 B2
(45) Date of Patent: Sep. 4, 2007

(54) ROTARY DAMPER

(75) Inventors: Ken Hayashi, Aichi-gun (JP); Shunsuke Okabayashi, Toyota (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 109 days.

(21) Appl. No.: 11/176,246

(22) Filed: Jul. 8, 2005

(65) Prior Publication Data

US 2006/0011428 A1 Jan. 19, 2006

(30) Foreign Application Priority Data

Jul. 14, 2004 (JP) ............................. 2004-207392
Nov. 29, 2004 (JP) ............................. 2004-343584

(51) Int. Cl.
*F16D 57/00* (2006.01)

(52) U.S. Cl. .................................... 188/290; 188/322.5

(58) Field of Classification Search ................ 188/290, 188/291, 292, 293, 294, 295, 296, 322.5
See application file for complete search history.

(56) References Cited

U.S. PATENT DOCUMENTS

| | | | | |
|---|---|---|---|---|
| 4,513,473 A * | 4/1985 | Omata | ............................. | 16/82 |
| 4,527,675 A * | 7/1985 | Omata et al. | ................ | 188/290 |
| 4,565,266 A * | 1/1986 | Omata | ...................... | 188/322.5 |
| 4,614,004 A * | 9/1986 | Oshida | ........................... | 16/82 |
| 4,691,811 A * | 9/1987 | Arakawa et al. | ............. | 188/290 |
| 4,796,733 A * | 1/1989 | Nakayama | ................... | 188/291 |
| 4,830,151 A * | 5/1989 | Numata | ........................ | 188/290 |
| 4,869,125 A * | 9/1989 | Saigusa | ........................ | 464/180 |
| 5,211,267 A * | 5/1993 | Clark | ........................... | 188/276 |
| 5,269,397 A * | 12/1993 | Kawamoto et al. | .......... | 188/290 |
| 5,277,282 A * | 1/1994 | Umemura | .................... | 188/290 |
| 5,301,775 A * | 4/1994 | Nedbal et al. | ............... | 188/290 |
| 5,381,877 A * | 1/1995 | Kobayashi | ................... | 188/290 |
| 5,522,485 A * | 6/1996 | Takahashi et al. | ........... | 188/306 |
| 6,041,899 A * | 3/2000 | Takamatsu | ................... | 188/290 |
| 6,561,323 B2 * | 5/2003 | Machida | ...................... | 188/293 |
| 6,604,614 B2 * | 8/2003 | Kurihara et al. | ............. | 188/290 |
| 6,662,683 B1 * | 12/2003 | Takahashi et al. | ........... | 464/180 |
| 6,678,918 B2 * | 1/2004 | Nakabayashi | ................... | 16/82 |
| 7,032,985 B1 * | 4/2006 | Ichioka et al. | ............ | 312/319.2 |

(Continued)

FOREIGN PATENT DOCUMENTS

DE 3921326 A1 * 1/1990

(Continued)

*Primary Examiner*—Robert A. Siconolfi
(74) *Attorney, Agent, or Firm*—Manabu Kanesaka (57) ABSTRACT

A rotary damper includes a driven rotary member having a driven rotary part for engaging a driving member, and a stationary support member for rotatably supporting the driven rotary member. A housing is disposed between the stationary support member and the driven rotary member, and a viscous fluid is disposed in the housing for damping the driven rotary member when the driven rotary member rotates relative to the stationary support member. A sealing member is disposed on the housing for sealing an outer peripheral edge of the housing so as to allow the driven rotary member to rotate relative to the stationary support member. An opening is formed in the driven rotary member or the stationary support member for communicating a portion of the housing inside the sealing member with atmosphere. The opening is closed when or after the driven rotary member and the stationary support member are assembled.

9 Claims, 7 Drawing Sheets

U.S. PATENT DOCUMENTS

| | | | |
|---|---|---|---|
| 2001/0017247 A1* | 8/2001 | Machida | 188/290 |
| 2003/0075404 A1* | 4/2003 | Takahashi | 188/290 |
| 2004/0155392 A1* | 8/2004 | Doornbos et al. | 267/290 |
| 2005/0045439 A1* | 3/2005 | Nishiyama | 188/290 |
| 2005/0077130 A1* | 4/2005 | Hayashi et al. | 188/290 |
| 2005/0115784 A1* | 6/2005 | Muller et al. | 188/290 |
| 2006/0011428 A1* | 1/2006 | Hayashi et al. | 188/290 |
| 2006/0113154 A1* | 6/2006 | Hayashi et al. | 188/290 |
| 2006/0207844 A1* | 9/2006 | Koizumi et al. | 188/290 |

FOREIGN PATENT DOCUMENTS

| | | |
|---|---|---|
| GB | 2 246 186 A | 1/1992 |
| GB | 2 286 869 A | 8/1995 |
| GB | 2 407 143 A | 4/2005 |
| JP | 1-37236 | 11/1989 |
| JP | 2519149 | 9/1996 |
| JP | 09-072366 | 3/1997 |
| JP | 11-030261 | 2/1999 |
| JP | 2603574 | 1/2000 |

* cited by examiner

ROTARY DAMPER

BACKGROUND OF THE INVENTION AND RELATED ART STATEMENT

The present invention relates to a rotary damper for dampening the relative rotation between a driven rotary member and a stationary support member, which rotatably supports said driven rotary member, with the viscous resistance of a viscous fluid.

As an example of the aforementioned rotary member, a damper comprising the following is known: a driven rotary member, which integrally includes a driven rotary part that engages with a driving member, such as a gear and rack; a stationary support member, which rotatably holds said driven rotary member; an annular housing, which is formed between said stationary support member and driven rotary member; a sealing means, which seals the outer peripheral edge of said housing so as to allow the driven rotary member and the stationary support member to relatively rotate; and a viscous fluid, which is stored in the housing and dampens the relative rotation of the driven rotary member and the stationary support member.

Patent Reference 1: Japanese Utility Model No. 2603574.

In the conventional rotary damper described above, an opening (orifice) is provided in the center of the stationary support member to provide communication between the housing and the atmosphere to thereby prevent the unnecessary (more than necessary) air from remaining within the housing during assembly of the driven rotary member and the stationary support member to facilitate the assembly, and prevent the air from mixing in with the viscous fluid to maintain a constant torque level. The rotary damper, however, includes no measures to prevent the viscous fluid from leaking from the opening (orifice), i.e., the opening (orifice) is not closed. Thus, the viscous fluid occasionally leaks from the opening (orifice) when used under a high temperature. Several rotary dampers wherein the leaking of viscous fluid from the opening (orifice) has been taken into consideration and thus include no opening (orifice) to provide communication between the housing and the atmosphere have been proposed.

Patent Reference 2: Japanese Utility Model Publication (Kokoku) No. 01-37236

Patent Reference 3: Japanese Patent No. 3421484

Patent Reference 4: Japanese Utility Model No. 2519149

Patent Reference 5: Japanese Patent Publication (Kokai) No. 11-30261

Providing no opening (orifice) for the housing to communicate with the atmosphere, however, traps air in the housing and makes the assembly more difficult. It also allows the air to mix in with the viscous fluid and causes torque level variations or instability in torque accuracy (irregular torque levels).

The present invention has been made in order to eliminate the inconveniences described above, and provides a rotary damper that eliminates the entrapment of unnecessary air in the housing, thereby facilitating assembly and preventing air from mixing with the viscous fluid for the maintenance of a precise torque level.

Further objects and advantages of the invention will be apparent from the following description of the invention.

SUMMARY OF THE INVENTION

The present invention is as follows.

(1) A rotary damper comprises a driven rotary member integrally including a driven rotary part to engage a driving member; a stationary support member to support said driven rotary member so as to freely rotate; an annular housing formed between said stationary support member and said driven rotary member; and a viscous fluid stored in said housing to dampen the relative rotation of said driven rotary member and said stationary support member. Sealing means is provided to seal the outer peripheral edge of said housing so as to allow said driven rotary member and said stationary support member to relatively rotate. An opening is provided in either said driven rotary member or said stationary support member to provide communication between the inside of said sealing means in said housing and the atmosphere. The opening is closed after said driven rotary member and said stationary support member are assembled.

(2) In the rotary damper described in (1), means for closing said opening is fusing of a closing member.

(3) In the rotary damper described in (2), the closing member is one portion of the member having said opening.

(4) In the rotary damper described in (2) or (3), a spacing regulator is provided in at least either said driven rotary member or the stationary support member to restrict the spacing between said driven rotary member and stationary support member along the rotation axis of the relative rotation performed when said driven rotary member and stationary support member are assembled.

(5) In the rotary damper described in (4), a center shaft is provided in the center of said stationary support member. A cylindrical part having said opening into which said center shaft is inserted is provided in said driven rotary member. A fusing regulator is provided in said cylindrical part to restrict the molten section of said cylindrical part from coming in contact with said center shaft.

(6) In the rotary damper described in (5), the fusing regulator also functions as said spacing regulator.

(7) In the rotary damper described in (1), means for closing said opening is press-fitting of a closing member.

(8) In the rotary damper described in (1), means for closing said opening is crimping of a closing member.

(9) In the rotary damper described in (1), means for closing said opening is adhesion of a closing member.

(10) A rotary damper comprises a driven rotary member integrally including a driven rotary part to engage a driving member; a stationary support member to support said driven rotary member so as to freely rotate; an annular housing formed between said stationary support member and said driven rotary member; and a viscous fluid stored in said housing to dampen the relative rotation of said driven rotary member and said stationary support member. Sealing means is provided to seal the outer peripheral edge of said housing so as to allow said driven rotary member and said stationary support member to relatively rotate. An opening is provided in either said driven rotary member or said stationary support member to provide communication between the inside of said sealing means in said housing and the atmosphere. The opening is closed when said driven rotary member and said stationary support member are assembled.

(11) In the rotary damper of one of (1) and (7) to (10), a spacing regulator is provided in at least either said driven rotary member or the stationary support member to restrict the spacing between said driven rotary member and stationary support member along the rotation axis of the relative rotation performed when said driven rotary member and stationary support member are assembled.

(12) In the rotary damper of one of (1) to (11), a center shaft is provided in the center of said stationary support member. A cylindrical part having said opening into which said center shaft is inserted is provided in said driven rotary member. A complementary engaging section is disposed between the inner periphery of said cylindrical part and the outer periphery of said center shaft to restrict the movements of said driven rotary member and stationary support member along the rotation axis of the relative rotation, and allow said driven rotary member and stationary support member to relatively rotate.

(13) In the rotary damper of one of (1) to (11), an engaging section, which restricts the movements of the driven rotary member and the stationary support member along the rotation axis of the relative rotation, and allows the driven rotary member and the stationary support member to relatively rotate, is provided in the outer sections of said driven rotary member and stationary support member.

According to the present invention, the opening is disposed in at least either the driven rotary member or the stationary support member to provide communication between the inside of the sealing means in the housing and the atmosphere, and the opening is closed after the driven rotary member and the stationary support member are assembled. Unnecessary air does not remain in the housing, and thus assembly is easier and a precise torque level is maintained since air does not mix in with the viscous fluid.

When the means for closing the opening is fusing of the closing member, the opening is securely closed to thereby prevent the viscous fluid from leaking from the opening.

When the closing member is one portion of the member having the opening, the opening is closed without separately preparing a closing member.

Providing the spacing regulator in at least either the driven rotary member or the stationary support member to restrict the spacing between the driven rotary member and the stationary support member along the rotation axis of the relative rotation performed when the driven rotary member and the stationary support member are assembled produces no fluctuations in the spacing between the driven rotary member and the stationary support member, thereby enabling maintenance of a precise torque level.

Disposing the center shaft in the center of the stationary support member, the cylindrical part having an opening to which the center shaft is inserted in the driven rotary member, and the fusing regulator in the cylindrical part for preventing the molten portion of the cylindrical part from coming in contact with the center shaft prevents the molten portion of the cylindrical part from adhering to the center shaft, thereby definitively allowing the driven rotary member or the stationary support member to rotate.

When the fusing regulator also functions as the spacing regulator, one component is provided with two functions, thereby simplifying the construction relative to the functions. When the means for closing the opening is press-fitting, crimping, or gluing of the closing member, the opening is securely closed, thereby preventing the viscous fluid from leaking from the opening.

Alternatively, the opening is disposed in at least either the driven rotary member or the stationary support member to provide communication between the inside of the sealing means in the housing and the atmosphere, and the opening is closed when the driven rotary member and the stationary support member are assembled. Unnecessary air does not remain in the housing, and thus the assembly is easier, and a precise torque level is maintained since air does not mix in with the viscous fluid. This also eliminates the need for an additional step to close the opening, thereby increasing efficiency in the assembly.

Disposing the complementary engaging section between the inner periphery of the cylindrical part and the outer periphery of the center shaft to restrict the movements of said driven rotary member and stationary support member along the rotation axis of the relative rotation, and allow said driven rotary member and stationary support member to relatively rotate makes it difficult for the driven rotary member to slip out of the stationary support member. This also enables forming of the driven rotary member and the stationary support member with two-part split molds, although a slider is used. Moreover, since the driven rotary member comes in contact with the stationary support member in the center section where the area of contact is limited, the frictional resistance between the driven rotary member and the stationary support member is reduced. Since the viscous fluid penetrates between the driven rotary member and the stationary support member, the frictional resistance between the driven rotary member and the stationary support member is further reduced.

Disposing the engaging section in the outer sections of the driven rotary member and the stationary support member to restrict the movements of said driven rotary member and stationary support member along the rotation axis of the relative rotation, and allow said driven rotary member and stationary support member to relatively rotate allows for forming of the driven rotary member and the stationary support member with two-part split molds, although a slider is used.

DETAILED DESCRIPTION OF PREFERRED EMBODIMENTS

In the following, embodiments of the present invention will be explained with reference to the drawings.

Figure 1:
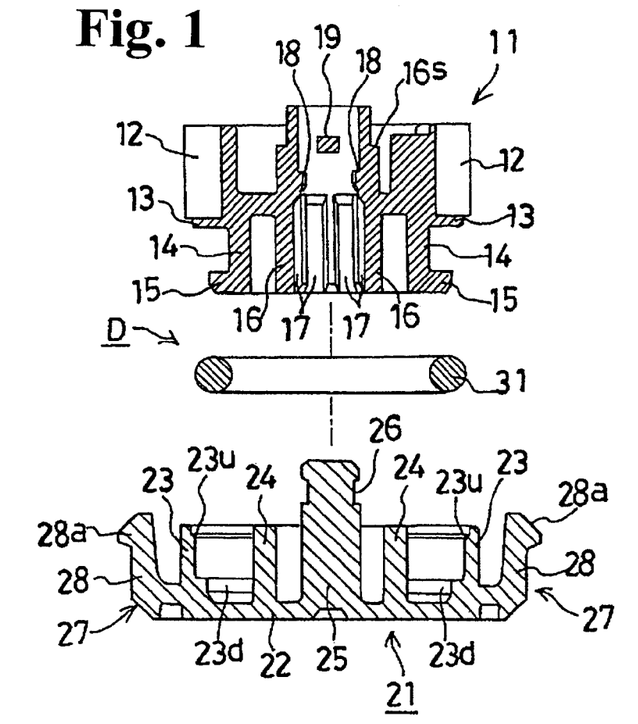
FIG. 1 is an exploded sectional front view of a rotary damper according to a first embodiment of the present invention.
Figure 2:
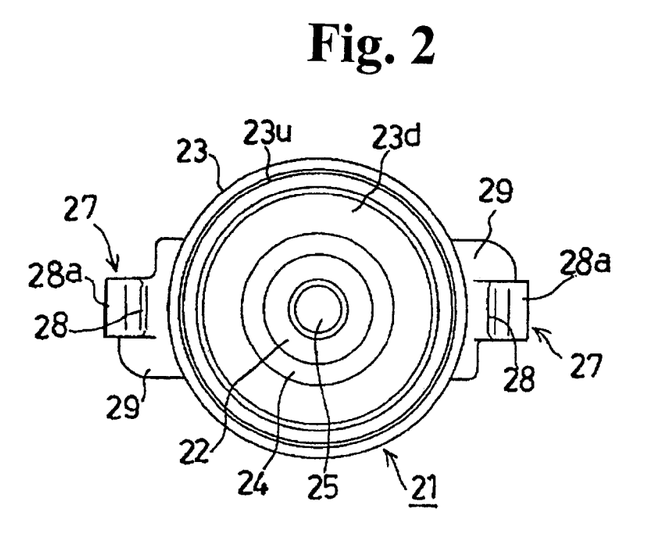
FIG. 2 is a plan view of a stationary member shown in FIG. 1.
Figure 3:
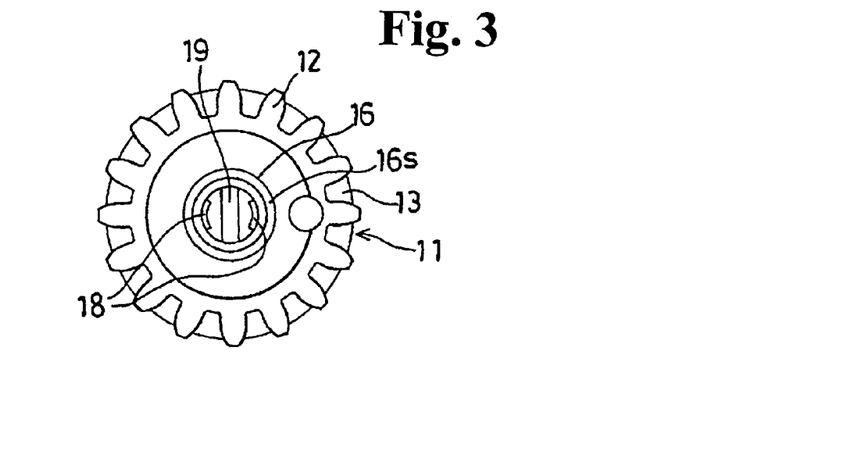
FIG. 3 is a plan view of a driven rotary member shown in FIG. 1.
Figure 4:
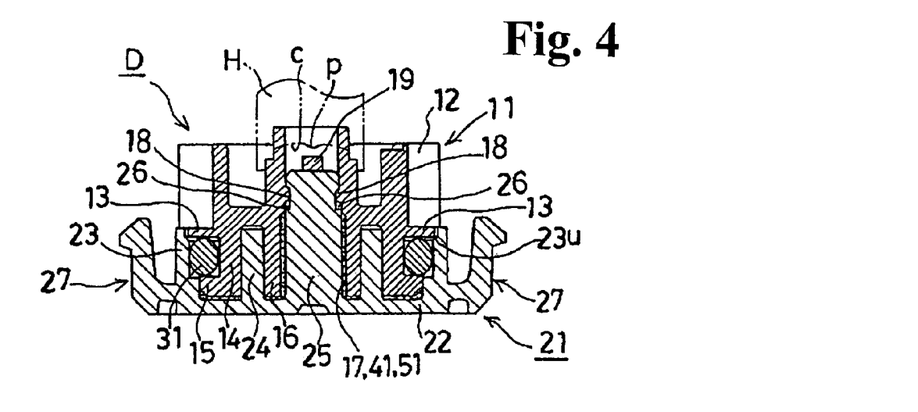
FIG. 4 is a sectional front view of the rotary damper in the middle of assembling the components shown in FIG. 1.
Figure 5:
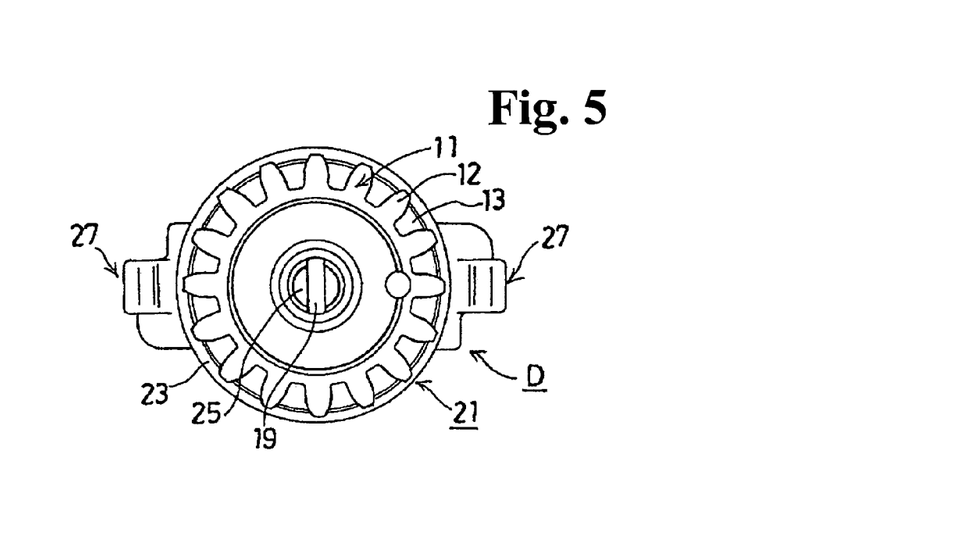
FIG. 5 is a plan view of the rotary damper in the middle of assembling the components shown in FIG. 1.
Figure 6:
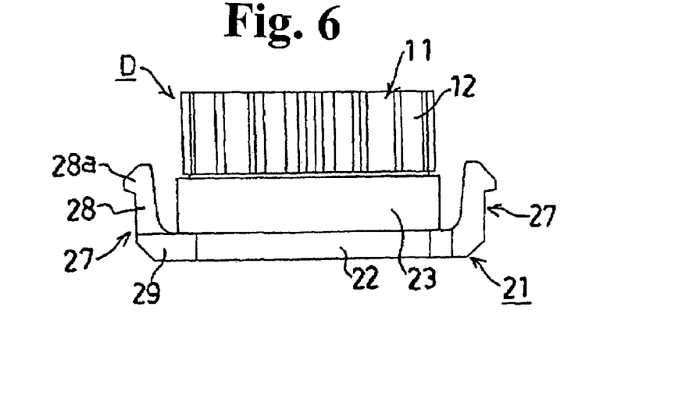
FIG. 6 is a front view of the rotary damper after assembling the components shown in FIG. 1.
Figure 7:
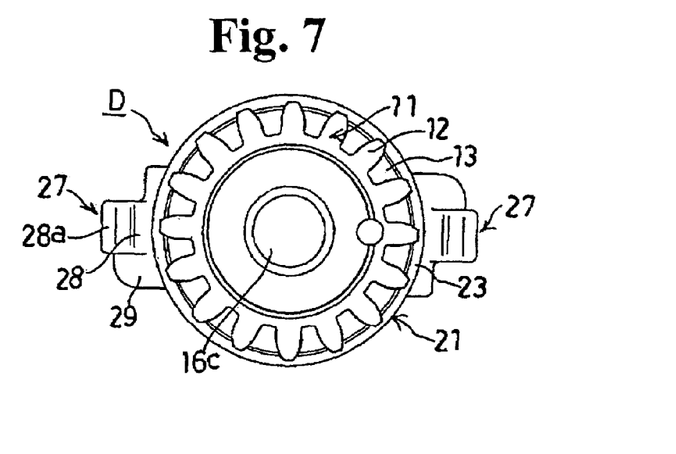
FIG. 7 is a plan view of the rotary damper after assembling the components shown in FIG. 1.
Figure 8:
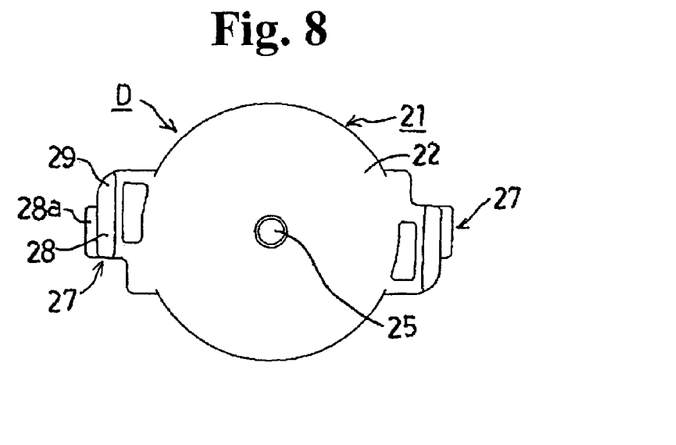
FIG. 8 is a bottom view of the rotary damper after assembling the components shown in FIG. 1.
Figure 9:
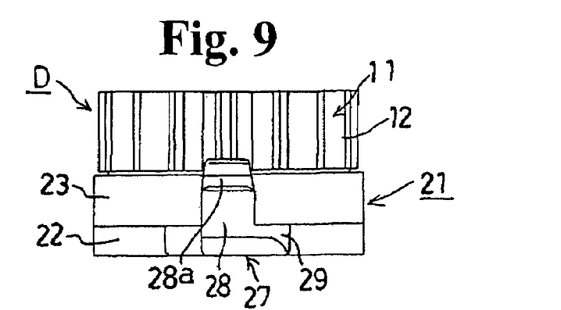
FIG. 9 is a right side view of the rotary damper after assembling the components shown in FIG. 1.
Figure 10:
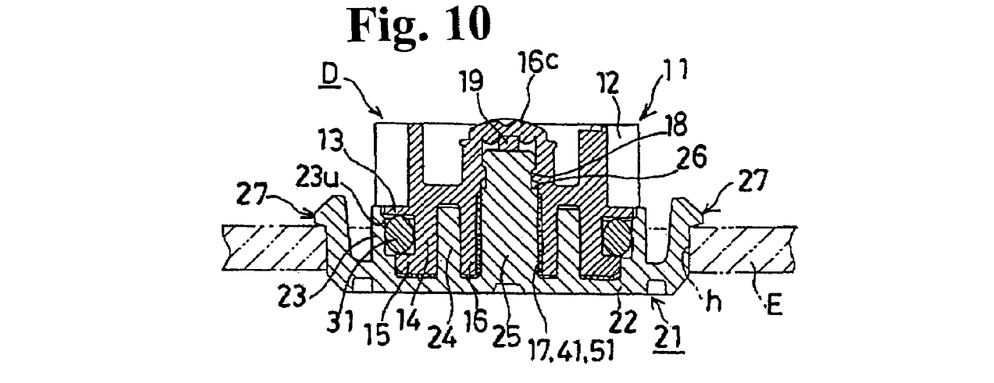
FIG. 10 is a sectional front view of the rotary damper after assembling the components shown in FIG. 1 and mounting to a mounting member.

FIG. 1 is an exploded sectional front view of a first embodiment of the rotary damper according to the present invention, FIG. 2 is a plan view of the stationary member shown in FIG. 1, FIG. 3 is a plan view of the driven rotary member shown in FIG. 1, FIG. 4 is a sectional front view of the rotary damper in the middle of assembling the components shown in FIG. 1, FIG. 5 is a plan view of the rotary damper in the middle of assembling the components shown in FIG. 1, FIG. 6 is a front view of the rotary damper after assembling the components shown in FIG. 1, FIG. 7 is a plan view of the rotary damper after assembling the components shown in FIG. 1, FIG. 8 is a bottom view of the rotary damper after assembling the components shown in FIG. 1, FIG. 9 is a right side view of the rotary damper after assembling the components shown in FIG. 1, and FIG. 10 is a sectional front view of the rotary damper after assembling the components shown in FIG. 1 and mounting to the mounting member. The rotary damper's rear view is identical with the front view, and the left side view is identical with the right side view.

In FIG. 1, reference character D represents the rotary damper, which comprises the following: a driven rotary member 11 made of a synthetic resin; a stationary support member 21 made of a synthetic resin to hold the rotary member 11 so as to freely rotate; an O ring 31 appropriately formed with silicon rubber, EPDM (ethylene-propylene-diene rubber), or the like that is attached to the driven rotary member 11 as a sealing means (seal member) to seal the outer peripheral edge of an annular housing 41 (see FIG. 4 or 10) formed between the driven rotary 11 member and the stationary support member 21 so that the driven rotary member 11 and the stationary support member 21 relatively rotate; and a viscous fluid 51 (see FIG. 4 or 10) made of grease, silicon oil, or the like that is filled within the housing 41 (see FIG. 4 or 10) formed by the driven rotary 11 member and the stationary support member 21 to dampen the relative rotation of the driven rotary 11 member and the stationary support member 21.

The aforementioned driven rotary member 11 comprises a gear 12 (see also FIG. 3) as a driven rotary part to engage a driving member, such as a gear and a rack, for example; a retaining flange 13 integrally disposed below the gear 12; an outer cylindrical wall 14 integrally disposed concentric with the gear 12 and below the support flange 13; a retaining flange 15 integrally disposed at the lower peripheral end of the gear 12 so as to face the retaining flange 13 and retain the O ring 31 jointly with the retaining flange 13 at the periphery of the outer cylindrical wall 14; and an inner cylindrical wall 16 as a cylindrical part that is disposed integrally and concentrically with the gear 12, running through up and down within the outer cylindrical wall 14 and having an opening to communicate with the housing 41. At the upper outer periphery of the inner cylindrical wall 16, a shoulder 16s that goes around is disposed. At the inner periphery of the inner cylindrical wall 16, the following are integrally formed: grooves 17, six grooves equally spaced at 60 degrees, for example, which extend up and down from the lower end to about the mid section; engaging projections 18 positioned above the grooves 17 equally spaced at 180 degrees, for example, each having a flat upper end and a slanted lower end that expands outwardly towards the bottom, to form relatively rotatable complementary engaging sections in conjunction with the later described peripheral locking groove 26 of the stationary support member 21 (see also FIG. 3); and a fusing regulator 19, which also serves as a spacing regulator, spanned over the engaging sections 18 to restrict the spacing between the driven rotary member 11 and the stationary support member 21 along the rotation axis of the relative rotation when the driven rotary member 11 and the stationary support member 21 are assembled, and also prevent, when the upper end of the inner cylindrical wall 16 is fused shut, the closed section 16c on which the molten upper end of the inner cylindrical wall 16 is solidified (see FIGS. 7 and 10) from coming in contact with the later described center shaft 25 of the stationary support member 21 (see also FIG. 3). The retaining flange 15 is chamfered at the outer lower end periphery and the inner upper end periphery.

The aforementioned stationary support member 21 comprises a bottom 22, circular in a horizontal plane; an outer cylindrical wall 23 disposed integrally with the periphery of the bottom 22 (see also FIG. 2); an inner cylindrical wall 24 disposed on the bottom 22 concentrically with the outer cylindrical wall 23 and inserted into the annular groove formed by the outer cylindrical wall 14 and the inner cylindrical wall 16 of the driven rotary member 11 (see also FIG. 2); a center shaft 25 disposed integrally and concentrically with the bottom 22 and inserted into the inner cylindrical wall 16 of the driven rotary member 11 (see also FIG. 2); and mounting sections 27 disposed integrally at the periphery of the bottom 22, spaced at 180 degrees, for example. The outer cylindrical wall 23 is provided with a lower shoulder 23d at the inner lower end to rotatably house the retaining flange 15 of the driven rotary member 11 on the inside, and an upper shoulder 23u at the inner upper end to rotatably house the retaining flange 13 of the driven rotary member 11 on the inside. The center shaft 25 is chamfered at the upper end periphery, and is provided with a peripheral locking groove 26 with a flat upper end on the periphery at the height that corresponds to the engaging projections 18 of the driven rotary member 11 to form relatively rotatable complementary engaging sections in conjunction with the engaging projections 18 of the driven rotary member 11. The mounting sections 27 extend outwardly from the bottom 22 and then upwardly, and are each composed of a retaining piece 28, which has a retaining hook 28a at the upper outer end, and a support projection 29 that extends outwardly from the bottom 22 and has a space for a mounted member, for example, the plate E (see FIG. 10), to be attached between the support projection and the retaining hook 28a.

In FIG. 4, reference character H represents a heating tip as a fusing jig which has a recess c that forms a portion of a sphere to house the upper section of the inner cylindrical wall 16 disposed at the lower end, and a projection p disposed in the center of the recess c.

Next, one example of the assembly of the rotary damper D will be explained. As shown in FIG. 1, the stationary support member 21 is placed on a work table, and a predetermined amount of the viscous fluid 51 is injected into the annular recess formed by the outer cylindrical wall 23 and the inner cylindrical wall 24. Then, the lower end of the driven rotary member 11 with the O ring 31 held by both the retaining flanges 13 and 15 on the outside of the outer cylindrical wall 14 is inserted into the stationary support member 21 by using the insertion of the center shaft 25 into the inner cylindrical wall 16 as a guide. Once the lower end of the driven rotary member 11 is inserted into the stationary support member 21 in this manner, the viscous fluid 51 and the air move between the driven rotary member 11 and the stationary support member 11 from the outer side to the inner side while being compressed by the two members, and penetrates into the space between the inner cylindrical wall 16 and the center shaft 25 via the grooves 17. Since the air travels faster than the viscous fluid 51, no air will remain in the housing 41 formed by the driven rotary member 11 and the stationary support member 21.

Once the lower end of the driven rotary member 11 is inserted into the stationary support member 21 as described above, the retaining flange 15 is rotatably inserted within the outer cylindrical wall 23, as shown in FIG. 4, and the O ring 31 seals between the outer cylindrical wall 23 and the outer cylindrical wall 14 so that the driven rotary member 11 and the stationary support member 21 relatively rotate. When the center shaft 25 penetrates into the inner cylindrical wall 16, goes over the engaging projections 18, and the upper end bumps against the fusing regulator 19, as shown in FIG. 4, the engaging projections 18 plunge into and engage the peripheral locking groove 26, as shown in FIG. 4.

In the state wherein the driven rotary member 11 is assembled to the stationary support member 21 as shown in FIG. 4, the heating tip H is heated by applying electric current, the upper end of the inner cylindrical wall 16 is inserted into the recess c of the heating tip H as indicated by the two-dot chain line, and the heating tip H is pushed down to melt and close the upper end of the inner cylindrical wall 16. By subsequently air cooling and removing the heating tip H, the assembly of the rotary damper D shown in FIGS. 6 to 10 is completed.

An example of how to mount the rotary damper D will be explained next. As shown in FIG. 10, the rotary damper D is mounted to the mounting plate E by utilizing a hole h created on the plate E, i.e., a circular hole shaped the same as the bottom 22 of the stationary support member 21 having notches created in the periphery 180 degrees apart to oppose each other to allow the mounting section 27 to be inserted, thereby interposing the mounting plate E between the retaining hooks 28a and the retaining projections 29.

The operation will be explained next. When the driven rotary member 11 rotates, the viscous resistance and the shearing resistance of the viscous fluid 51 positioned between the driven rotary member 11 and the stationary support member 21 regulate the rotation of the driven rotary member 11. Thus, the rotation or movement of the gear, rack, or the like that engages with the gear 12 of the driven rotary member 11 is dampened to slowly rotate or move the gear, rack, or the like.

As described above, according to the first embodiment of the present invention, the inner cylindrical wall 16 (the opening) is disposed in the driven rotary member 11 to communicate the center section of the housing 41 with the atmosphere, and the inner cylindrical wall 16 (the opening) is closed subsequent to the assembly of the driven rotary member 11 and the stationary support member 21. Therefore, no unnecessary air will remain in the housing 41; assembly is easier, and a precise torque level is maintained since the air does not mix in with the viscous fluid 51. As the means for closing the inner cylindrical wall 16 (the opening), the upper end of the inner cylindrical wall 16 (one portion of the member having the opening) is utilized and fused; this securely closes the inner cylindrical wall 16 (the opening) without any need to separately prepare a closing member, and prevents the viscous fluid 51 from leaking from the inner cylindrical wall 16 (the opening).

In addition, the spacing regulator (the fusing regulator 19), which restricts the spacing along the rotation axis of the driven rotary member 11 relative to the stationary support member 21 that relatively rotates when assembled, is disposed on the driven rotary member 11, thereby preventing fluctuation of the spacing between the driven rotary member 11 and the stationary support member 21, and enabling maintenance of a precise torque level.

The center shaft 25 is disposed in the center of the stationary support member 21, the inner cylindrical wall 16 having an opening into which the center shaft 25 is inserted is disposed on the driven rotary member 11, and the fusing regulator 19 is disposed within the inner cylindrical wall 16 to prevent the molten upper end of the inner cylindrical wall 16 from coming in contact with the center shaft 25. This prevents the molten upper end of the inner cylindrical wall 16 from adhering to the center shaft 25, and thus securely allows for the relative rotation of the driven rotary member 11 and the stationary support member 21. Since the fusing regulator 19 also functions as a spacing regulator, one component being provided with two functions, construction is simplified relative to the functions.

Since the complementary engaging sections (the engaging projections 18 and the peripheral locking groove 26), as engaging sections, are provided between the inner periphery of the inner cylindrical wall 16 and the outer periphery of the center shaft 25 to restrict the movements of the relatively rotating driven rotary member 11 and the stationary support member 21. along the rotation shaft, and allow for the relative rotation of the driven rotary member 11 and the stationary support member 21, the driven rotary member 11 is less likely to slip out of the stationary support member 21. Moreover, the driven rotary member 11 and the stationary support member 21 can be formed with two-part split molds, although a slider is used. In addition, the driven rotary member 11 comes in contact with the stationary support member 21 in the center section where the contact area is limited. This reduces the frictional resistance between the driven rotary member 11 and the stationary support member 21, which is further reduced by the viscous fluid 51 that penetrates between the driven rotary member 11 and the stationary support member 21. Moreover, the retaining flange 15 provided in the outer cylindrical wall 14 prevents the 0 ring 31 from slipping off of the outer cylindrical wall 14 and increases the efficiency of the assembly work. The grooves 17 provided at the inner periphery of the inner cylindrical wall 16 allow the air within the housing 41 to travel via the grooves 17 and be released to the atmosphere from the inner cylindrical wall 16, and the viscous fluid 51 to travel via the grooves 17 into the space between the inner cylindrical wall 16 and the inner cylindrical wall 24. Thus, unnecessary air does not remain in the housing 41, thereby making assembly even easier, nor does the air mix in with the viscous fluid 51, thereby further facilitating maintenance of a precise torque level.

Figure 11:
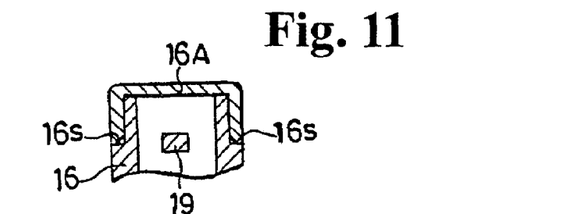
FIG. 11 is an explanatory diagram of an example of means for closing an inner cylindrical wall.
Figure 12:
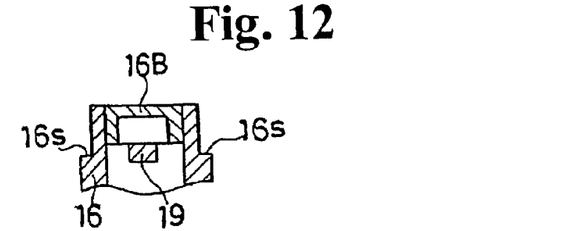
FIG. 12 is an explanatory diagram of another example of the means for closing the inner cylindrical wall.
Figure 13:
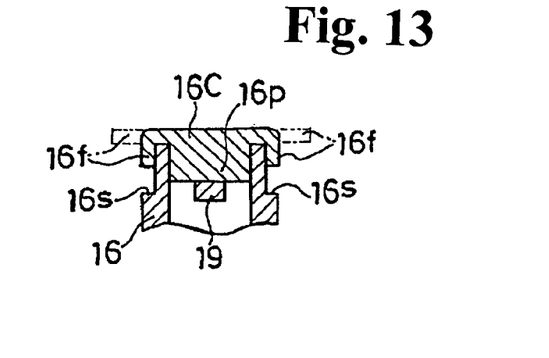
FIG. 13 is an explanatory diagram of a further example of the means for closing the inner cylindrical wall.
Figure 14:
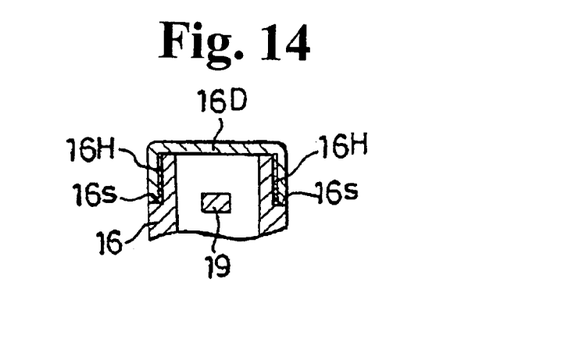
FIG. 14 is an explanatory diagram of a still further example of the means for closing the inner cylindrical wall.

FIG. 11 is an explanatory diagram of an example of the means for closing the inner cylindrical wall (the opening), FIG. 12 is an explanatory diagram of another example of the means for closing the inner cylindrical wall (the opening), FIG. 13 is an explanatory diagram of yet another example of the means for closing the inner cylindrical wall (the opening), and FIG. 14 is an explanatory diagram of another example of the means for closing the inner cylindrical wall (the opening); the same reference numerals are used to identify the parts that are the same as or corresponding to those shown in FIGS. 1 to 10 for which the explanation is omitted.

In FIG. 11, reference 16A represents a synthetic resin cap as a closing member, which seals the inner cylindrical wall 16 (the opening) by press-fitting the upper end of the inner cylindrical wall 16 thereto. In FIG. 12, reference 16B represents a synthetic resin cap as a closing member, which seals the inner cylindrical wall 16 (the opening) by being press-fitted into the upper end of the inner cylindrical wall 16. In FIG. 13, reference 16C represents a synthetic resin cap as a closing member, which seals the inner cylindrical wall 16 (the opening) by fitting a cylindrical projection 16p to the upper end of the inner cylindrical wall 16 and crimping or fusing the flange 16f that projects outwardly from the projection 16p. In FIG. 14, reference 16D represents a synthetic resin cap as a closing member, which seals the inner cylindrical wall 16 (the opening) by inserting the upper end of the inner cylindrical wall 16 thereto and allowing the inner peripheral surface thereof to surround and be glued to the outer peripheral surface of the upper end of the inner cylindrical wall 16 with an adhesive 16H.

Closing the inner cylindrical wall 16 (the opening) with any of the caps 16A to 16D as above also achieves the same effect as in the first embodiment. In the examples shown in FIGS. 11 and 12, the caps 16A and 16B may also be melted to seal the inner cylindrical wall 16. Alternatively, the cap may be inserted into the upper end of the inner cylindrical wall 16 as in the example in FIG. 12 so that the outer peripheral surface is glued to to seal the inner peripheral surface of the upper end of the inner cylindrical wall 16 with an adhesive.

Figure 15:
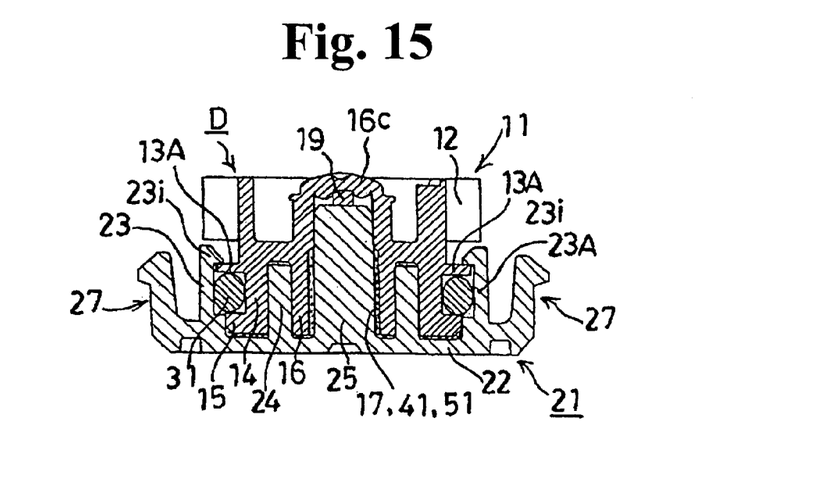
FIG. 15 is a sectional front view of a rotary damper according to a second embodiment of the present invention.

FIG. 15 is a sectional front view of a second embodiment of the rotary damper according to the present invention; the same reference numerals are used to identify the parts that are the same as or corresponding to those in FIGS. 1 to 14 for which the explanation is omitted.

In FIG. 15, reference 13A represents a retaining flange, and a predetermined spacing is provided between that and the gear 12 to allow the later described engaging hooks 23i of the retaining flange 13A to pass through. Reference 23A represents an outer cylindrical wall disposed integrally with the outer edge of the bottom 22, and at the inner upper end thereof there are provided, at a predetermined spacing, engaging hooks 23i, four pieces in the periphery 90 degrees apart, for example, whose upper sections tilt down inwardly as they project inwardly to rotatably engage the upper surface of the retaining flange 13A of the driven rotary member 11. The retaining flange 13A and the engaging hooks 23i described above comprise engaging sections for the driven rotary member 11 and the stationary support member 21 to enable relative rotation. The other components of the rotary damper D in the second embodiment are the same as in the first embodiment.

Next, one example of the assembly of the rotary damper D will be explained. As shown in FIG. 1, the stationary support member 21 is placed on a work table, and a predetermined amount of the viscous fluid 51 is injected into the annular recess formed by the outer cylindrical wall 23A and the inner cylindrical wall 24. Then, the lower end of the driven rotary member 11 with the O ring 31 held by both the retaining flanges 13A and 15 on the outside of the outer cylindrical wall 14 is inserted into the stationary support member 21 by using the insertion of the center shaft 25 into the inner cylindrical wall 16 as a guide. Once the lower end of the driven rotary member 11 is inserted into the stationary support member 21 in this manner, the viscous fluid 51 and the air move between the driven rotary member 11 and the stationary support member 11 from the outer side to the inner side while being compressed by the two members, and penetrates into the space between the inner cylindrical wall 16 and the center shaft 25 via the grooves 17. Since the air travels faster than the viscous fluid 51, no air will remain in the housing 41 formed by the driven rotary member 11 and the stationary support member 21.

Once the lower end of the driven rotary member 11 is inserted into the stationary support member 21 as described above, the retaining flange 15 is rotatably inserted within the outer cylindrical wall 23A, as shown in FIG. 15, the O ring 31 seals between the outer cylindrical wall 23A and the outer cylindrical wall 14 so that the driven rotary member 11 and the stationary support member 21 relatively rotate, and the engaging hooks 23i rotatably engage the upper surface of the retaining flange 13A by spreading once and regaining the original shapes after going over the retaining flange 13A. When the center shaft 25 penetrates into the inner cylindrical wall 16, goes over the engaging projections 18, and the upper end bumps against the fusing regulator 19, as shown in FIG. 15, the engaging projections 18 plunge into and engage the peripheral locking groove 26.

In the state wherein the driven rotary member 11 is assembled to the stationary support member 21 as shown in FIG. 4, the heating tip H is heated by applying electric current, the upper end of the inner cylindrical wall 16 is inserted into the recess c of the heating tip H as indicated by the two-dot chain line, and the heating tip H is pushed down to melt and close the upper end of the inner cylindrical wall 16. By subsequently air cooling and removing the heating tip H, the assembly of the rotary damper D shown in FIG. 15 is completed.

The mounting and operation of the rotary damper D in the second embodiment is the same as in the first embodiment, and thus the explanation is omitted.

The second embodiment can also achieve the same effect as the first embodiment. Since the engaging sections (the retaining flange 13A and the engaging hooks 23i), which enable the relative rotation of the driven rotary member 11 and the stationary support member 21, are disposed on the outer sections of the driven rotary member 11 and the stationary support member 21, the driven rotary member 11 and the stationary support member 21 can be formed with a two-part split mold, although a slider is used.

Figure 16:
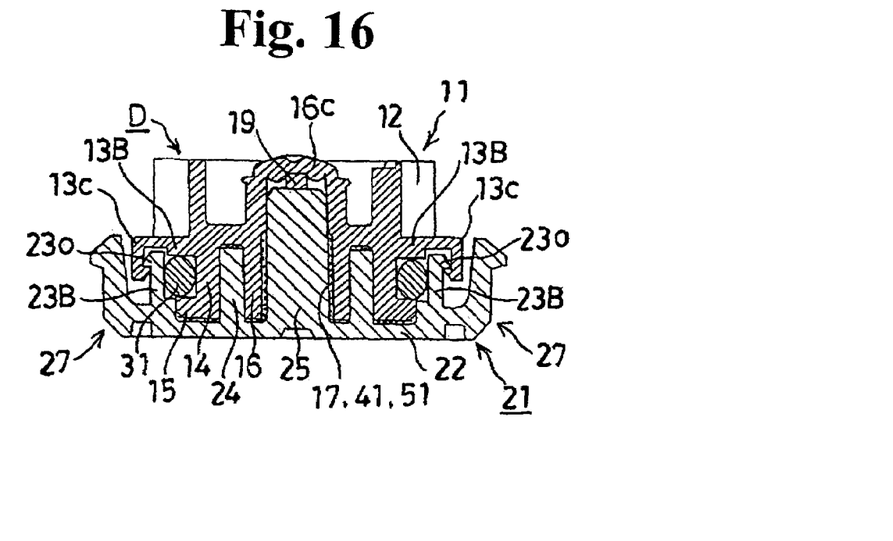
FIG. 16 is a sectional front view of a rotary damper according to a third embodiment of the present invention.

FIG. 16 is a sectional front view of a third embodiment of the rotary damper according to the present invention; the same reference numerals are used for the parts that are same as or corresponding to those in FIGS. 1 to 15 for which the explanation is omitted.

In FIG. 16, reference 13B is a retaining flange disposed integrally below the gear 12, and at the outer edge thereof there are provided engaging hooks 13c at a predetermined spacing, four pieces in the periphery 90 degrees apart, for example, that are L-shaped, extending outwardly and then downwardly, and that have a slanted lower inner end that spreads from the upper side to the lower side, to engage the peripheral engaging section 23o of the later described outer cylindrical wall 23B. Reference 23B represents an outer cylindrical wall disposed integrally at the outer edge of the bottom 22, and at the outer upper end thereof there is provided a peripheral engaging section 23o whose upper section is a tilted surface that drops outwardly as it projects outwardly to rotatably engage the lower surfaces of the engaging hooks 13c of the retaining flange 13B of the driven rotary member 11. The engaging hooks 13c and the peripheral engaging section 23o described above comprise the engaging sections to enable the relative rotation of the driven rotary member 11 and stationary support member 21. The other components of the rotary damper D in the third embodiment are the same as in the first embodiment. The rotary damper D in the third embodiment can be assembled in the same manner as that for the second embodiment, and the mounting and operation of the rotary damper D in the third embodiment are the same as in the first embodiment; thus, the explanation is omitted. The third embodiment can also achieve the same effect as the second embodiment.

Figure 17:
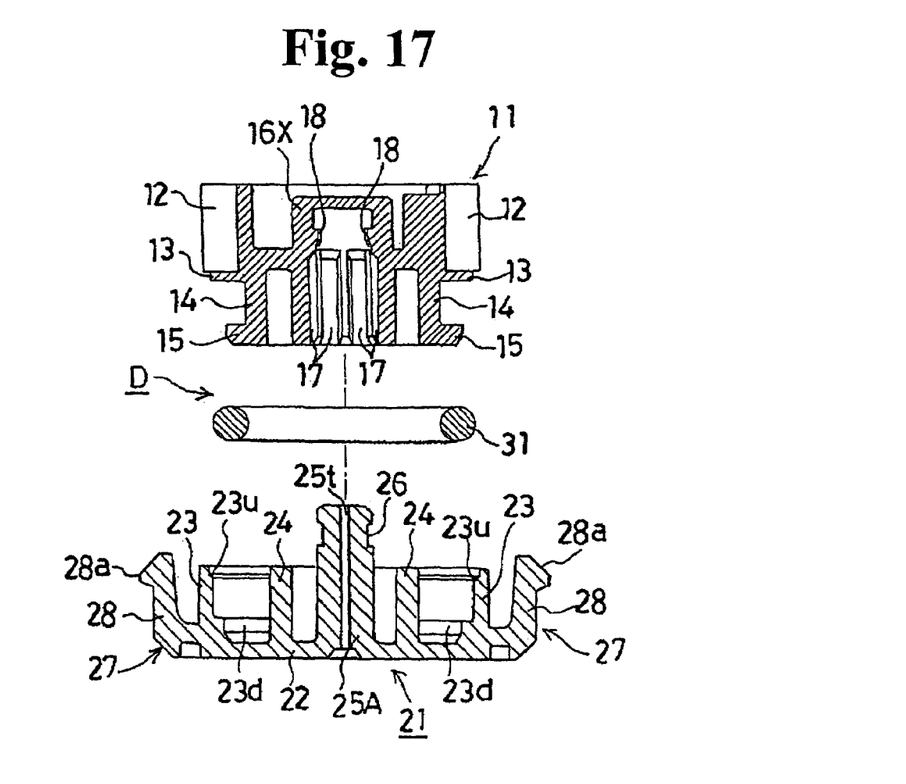
FIG. 17 is an exploded sectional front view of a rotary damper according to a fourth embodiment of the present invention.
Figure 18:
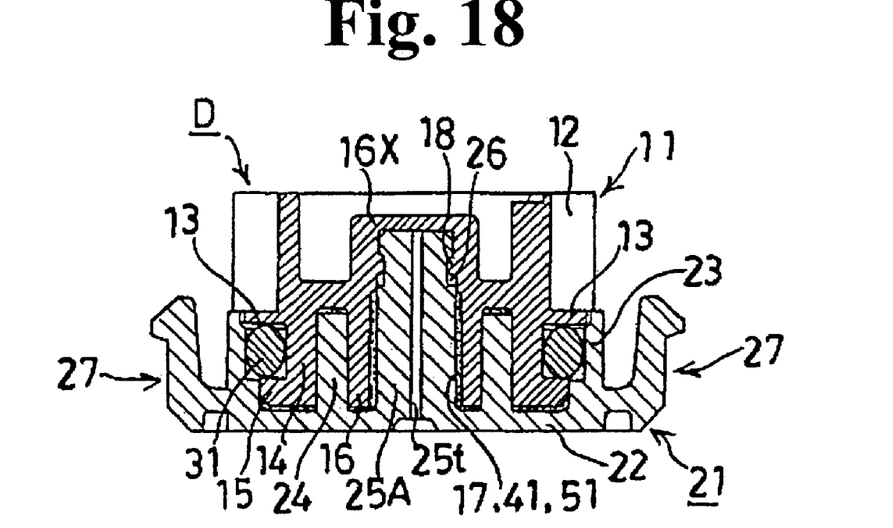
FIG. 18 is a sectional front view of the rotary damper after assembling the components shown in FIG. 17.

FIG. 17 is an exploded sectional front view of a fourth embodiment of the rotary damper according to the present invention, and FIG. 18 is a sectional front view of the rotary damper when the components shown in FIG. 17 are assembled; the same reference numerals are used for the same or corresponding parts in FIGS. 1 to 16 for which the explanation is omitted.

In FIG. 17, reference 16X represents an inner cylindrical wall with a closed end, the lower end being open, that is provided with grooves 17 and engaging projections 18 on the inside. Reference 25A represents a center shaft provided with a through hole 25t in the center. The height (length) of the center shaft 25A is set so that the closed end of the inner cylindrical wall 16X abuts the upper end thereof and closes the through hole 25t when the driven rotary member 11 is assembled to the stationary support member 21. Thus, the inner cylindrical wall with a closed end 16X, as a closing member, also functions as a spacing regulator.

The rotary damper D in the fourth embodiment can be assembled as shown in FIG. 18 in the same manner as in the first embodiment (excluding the fusing performed with the heat tip H). Since the mounting and operation of the rotary damper D in the fourth embodiment are the same as in the first embodiment, the explanation is omitted.

The fourth embodiment can also achieve the same effect as the first embodiment. Since the construction is such that the through hole 25t (opening) is closed when the driven rotary member 11 and the stationary support member 21 are assembled, a separate step of closing the through hole 25t is unnecessary. This increases efficiency in assembly. Moreover, as the cylindrical wall with a closed end 16X also serves as a closing member, one component being provided with two functions, construction is simplified relative to the functions.

Figure 19:
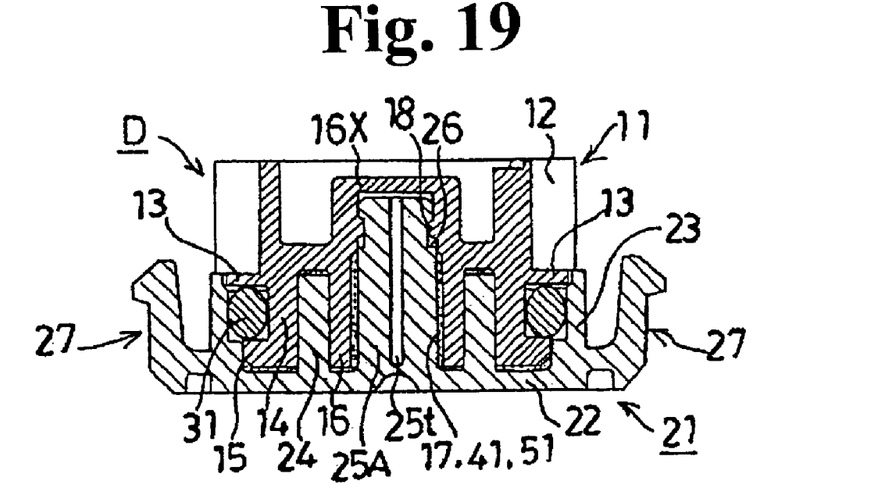
FIG. 19 is a sectional front view of a rotary damper according to a fifth embodiment of the present invention.

FIG. 19 is a sectional front view of a fifth embodiment of the rotary damper according to the present invention; the same reference numerals are used for the same or corresponding parts in FIGS. 1 to 18 for which the explanation is omitted.

The fifth embodiment differs from the fourth embodiment as follows: the closed end of the inner cylindrical wall with a closed end 16X is away from the upper end of the center shaft 25 when the driven rotary member 11 is assembled to the stationary support member 21, and the free end (lower end) of the through hole 25t (opening) is fused shut after the driven rotary member 11 and the stationary support member 21 are assembled. The fifth embodiment can also achieve the same effect as the first embodiment.

In the above, the embodiment wherein the spacing regulator (fusing regulator 19) that restricts the spacing between the driven rotary member 11 and the stationary support member 21 along the rotation axis of the relative rotation when the driven rotary member 11 and the stationary support member 21 are assembled is disposed on the driven rotary member 11 has been described. However, as shown in FIGS. 4 and 10, the upper shoulder 23u of the outer cylindrical wall 23 to which the retaining flange 13 is abutted may be used as the spacing regulator. Moreover, the example wherein the inner cylindrical wall 16 was provided with the engaging projections 18 therein, and the center shaft 25 was provided with the peripheral locking groove 26, was described. However, the inner cylindrical wall may be provided with the locking peripheral groove and the center shaft with the engaging projections. Although the example wherein the O ring 31 is provided as a sealing means was given, the sealing means may be composed of relatively rotatable concave and convex parts, and the parts may further be formed in two colors and with a soft material for the convex part. The through hole 25t in the fifth embodiment may be disposed in the center shaft 25 in any of the first to fourth embodiments, said through hole 25t being closed by fusing after it is assembled. To ensure the deflection amount of the engaging hooks 23i in the second embodiment, slits can be created on the right and left sides of the engaging hooks 23i on the upper portion of the outer cylindrical wall 23A that is pressured and sealed by the O ring 31 to thereby deflect a portion of the outer cylindrical wall 23A. The engaging sections have been shown as comprised of the engaging projections 18 and the peripheral locking groove 26 (the first, fourth and fifth embodiments), the retaining flange 13A and the engaging hooks 23i (the second embodiment), or the engaging hooks 13c and the peripheral locking section 23o (the third embodiment), but any of the engaging sections may be used.

The disclosures of Japanese Patent Applications No. 2004-207392 filed on Jul. 14, 2004, and No. 2004-343584 filed on Nov. 29, 2004 are incorporated in the application.

While the invention has been explained with reference to the specific embodiments of the invention, the explanation is illustrative and the invention is limited only by the appended claims.

What is claimed is:

1. A rotary damper comprising:
    a driven rotary member,
    a stationary support member for rotationally supporting the driven rotary member,
    a housing disposed between the stationary support member and the driven rotary member,
    a viscous fluid disposed in the housing for damping the driven rotary member when the driven rotary member rotates relative to the stationary support member,
    a sealing member disposed on the housing for sealing an outer peripheral edge of the housing so as to allow the driven rotary member to rotate relative to the stationary support member,
    an opening formed in one of the driven rotary member and the stationary support member at a center thereof for communicating a portion of the housing inside the sealing member with atmosphere, said opening being closed at least after the driven rotary member and the stationary support member are assembled, and
    a closing member to be fused for closing the opening.

2. A rotary damper according to claim 1, wherein said closing member is a portion of the one of the driven rotary member and the stationary support member.

3. A rotary damper according to claim 1, further comprising a spacing regulator formed in at least one of the driven rotary member and the stationary support member for controlling a distance between the driven rotary member and the stationary support member in an axial direction thereof when the driven rotary member and the stationary support member are assembled.

4. A rotary damper according to claim 3, wherein said stationary support member includes a center shaft disposed at a center thereof, and said driven rotary member includes a cylindrical part having the opening for inserting the center shaft, said cylindrical part having a fusing regulator for preventing a molten section of the cylindrical part from contacting the center shaft.

5. A rotary damper according to claim 4, wherein said fusing regulator forms the spacing regulator.

6. A rotary damper according to claim 1, wherein said stationary support member includes a center shaft disposed at a center thereof, and said driven rotary member includes a cylindrical part having the opening for inserting the center shaft, a complementary engaging section being disposed between an inner periphery of the cylindrical part and an outer periphery of the center shaft for restricting the driven rotary member and the stationary support member from moving along a rotational axis thereof and allowing the driven rotary member to rotate relative to the stationary support member.

7. A rotary damper according to claim 1, further comprising an engaging section disposed outside the driven rotary member and the stationary support member for restricting the driven rotary member and the stationary support member to move along a rotational axis of the driven rotary member, said engaging section allowing the driven rotary member to rotate relative to the stationary support member.

8. A rotary damper according to claim 1, wherein said stationary support member includes a center shaft disposed at a center thereof, and said driven rotary member includes a cylindrical part having the opening for inserting the center shaft, said cylindrical part having a length greater than that of the center shaft for forming a closed section of the cylindrical part, and a fusing regulator formed below the closed section for preventing a molten section of the cylindrical part from contacting the center shaft when the closed section is formed at the cylindrical part.

9. A rotary damper according to claim 1, wherein said the opening is defined by a cylindrical part, said cylindrical part being partly fused to entirely close the cylindrical part to thereby form the closing member.

* * * * *